Sept. 22, 1942.　　　A. R. SWENSON　　　2,296,317

WELDING DEVICE

Filed Oct. 2, 1940

INVENTOR
A. R. SWENSON
BY
E. R. Nowlan
ATTORNEY

Patented Sept. 22, 1942

2,296,317

UNITED STATES PATENT OFFICE 2,296,317

WELDING DEVICE

Arthur R. Swenson, Fanwood, N. J., assignor to Western Electric Company, Incorporated, New York, N. Y., a corporation of New York Application October 2, 1940, Serial No. 359,357

5 Claims. (Cl. 219—4)

This invention relates to a welding device, and more particularly to a hand actuable device for grasping and electrically welding members located in difficultly accessible sites.

In the assembly of electrical apparatus of many various kinds, e. g., telephone central apparatus, radio apparatus and others, it may often be desirable or necessary, after placing units of the apparatus in position, to secure small parts, such as terminal wires, rods, strips or the like together by electrically welding them. In such cases it will not infrequently occur that the members to be welded, while in approximate juxtaposition, are together so located that access to them is obstructed except along some relatively long and narrow aisle of access. This may occasion great difficulty in effecting a suitable weld by ordinary means, or even render the welding impossible by such means.

An object of the present invention is to provide a simple, reliable and handy device or tool to grasp, press together and weld electrically parts situated in locations difficult or impossible of access by ordinary apparatus.

With the above and other objects in view, the invention may be embodied in a tool comprising a relatively long slender rod-like electrode slidable within and insulated from an enveloping coaxial tubular electrode, means at the outer end of one or the other or both electrodes to grip parts to be welded and press them together by movement of one electrode with respect to the other, and means to move one electrode along the other to exert limited predetermined gripping pressure only.

Figure 1:
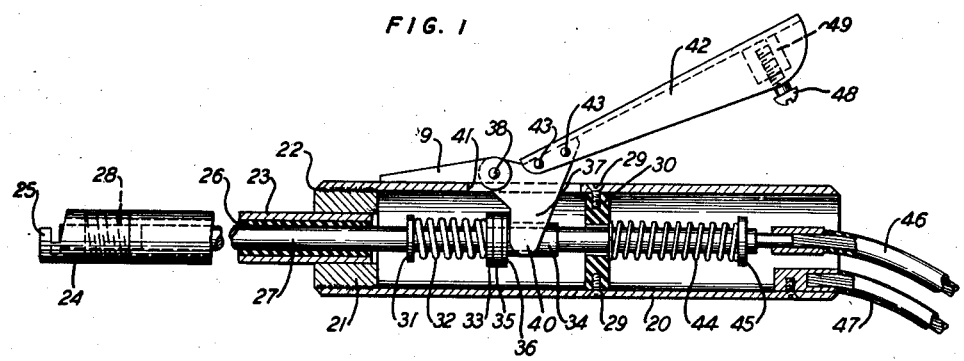
Figure 2:
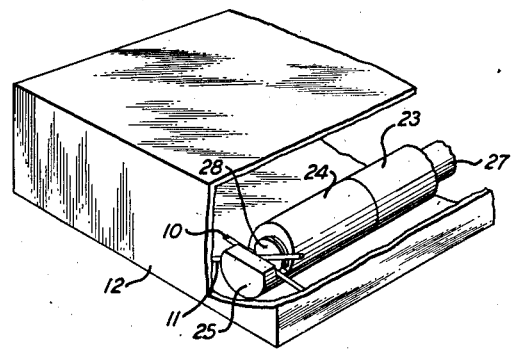

Other objects and features of the invention will appear from the following detailed description of one embodiment thereof taken in connection with the accompanying drawing, in which the same reference numerals are applied to identical parts in the several figures and in which Fig. 1 is a view in longitudinal central section of a tool constructed in accordance with the invention; and Fig. 2 is a broken, diagrammatic perspective view to illustrate the use of the tool.

In the embodiment of the invention herein disclosed, there is presented to illustrate the invention, a tool particularly adapted to grip, press and weld together a pair of juxtaposed wire terminals or analogous members 10 and 11 located near the bottom of some relatively deep and narrow recess or obstructed space, here illustrated by a diagrammatic case or housing 12.

The tool has a hollow, preferably tubular, handle 20 of electrically conductive metal, e. g., hard drawn copper. An axially bored plug 21 of conductive metal is rigidly secured in and electrically connected to the handle 20 in the front end thereof, e. g., by soldering, brazing, welding or the like, as at 22, or by rivets, screws or the like. A relatively long, stiff, slender, tubular conductor 23 is secured at one end in the bore of the plug 21 to extend axially and forwardly from the handle. This conductor and the plug 21 may both be of copper or other suitable metal, and the conductor is soldered or otherwise suitably secured in the plug.

On the outer end of the tube 23 and coaxial therewith is secured in any suitable manner, preferably by being threaded on, a substantially like sized tube 24 of material suitable for a resistance welding electrode, such as one of the alloys known commercially as "Electroloy" of which a representative member consists essentially of about 99.5% copper and about 0.5% chromium. This member 24 is formed further with an integral forwardly and then upwardly projecting hook 25 extending from its under side and up past its axis.

Inside the tube 23 and its tubular extension 24 is a continuous tubular sheath or lining 26 of insulating material, e. g., paper, friction tight against the continuous inner surface of the two tubes.

An axially disposed rod-like electrode 27 is housed within the tubes 23 and 24 and within the tubular sheath 26, to be easily slidable therein but preferably without material looseness. The rod 27 may also be preferably of hard drawn copper and carry at its outer end and secured to it, an electrode proper 28 of suitable material such as "Electroloy," coaxial and of the same diameter as the rod 27.

The tube 23 does not extend back past the plug 21. The rod 27 extends axially back through the greater part of the handle. Within the handle, transversely across it and about at its middle, is secured as by screws 29 an annulus or washer 30 of insulating material, e. g., hard rubber, artificial resin, hard fiber, or the like, to guide and support the rod 27 passing through it.

A metal washer or flange member 31 is rigidly secured on the rod 27 somewhat back of the plug 21 and forms a front abutment for a helical compression spring 32 loosely surrounding the rod. The rear end of this spring is abutted by a washer 33 slidable on the rod. Back of the washer 33 and on the rod 27 is a slidable sleeve 34 of insulating material and having at its front end an integral insulating flange 35 abutting the rear face of the washer 33. A metal protective washer 36 is mounted on the sleeve 34 against the rear face of the flange 35.

An operating lever 37 pivoted at 38 on a bracket 39 secured on the outer face of the handle 20 in any suitable manner, has a forked arm 40 extending through a slot 41 in the handle, to abut against the rear face of the washer 36 on either side of the sleeve 34 and rod 27. An actuating handle 42 is secured as by rivets 43, to an upstanding arm of the lever 37.

A second helical spring 44 surrounds the rod 27 back of the insulating washer 30 and abuts at its forward end against it. The rear end of the spring abuts against a metal washer 45 rigidly secured on the rod 27.

Suitable electrical cables 46 and 47, connected to a source (not shown) of welding current, are secured and electrically connected in any suitable fashion to the rear portions respectively of the rod 27 and handle 20.

In operation, assuming as illustrated in Fig. 2 that a pair of wires 10 and 11 located near the bottom of a narrow space are to be welded together, the long slender combination of the welding tips 24 and 28 carried by the telescopically related tube 23 and rod 27 respectively, may be readily and conveniently inserted and the hook 25 placed behind the crossed wires, so that these lie, as shown, between the hook and the end face of the tip 28. The actuating handle 42 is then squeezed down on the main handle 20. The lever arm 40 presses forward against the washer 36; and this pressure is transmitted through the flange 35, washer 33, spring 32 and washer 31 to the rod 27 which moves forward and clamps the wires 10 and 11 together under a pressure controlled and defined by the spring 32. Means may be provided to adjust the maximum value of this pressure to accord with the dimensions and material of the parts to be welded, such, for example, as an adjusting screw stop 48 mounted in a block 49 secured to the actuating handle 42.

While the wires 10 and 11 are thus held together under predetermined pressure, the welding current is allowed to flow through them from the cables 46 and 47 via the electrode tip 28 and electrode tip hook 25, thus effecting the weld. Upon release of the handle 42, the rod 27 and its electrode tip 28 retire releasing the welded parts.

The spring 32 is preferably relatively stiff and heavy and the spring 44 relatively soft and light. For example, in one case in practice, the spring 32 required thirty pounds pressure for one-quarter inch compression from its unstressed state, while the spring 44 required only six ounces for one-quarter inch. Thus when the handle 42 is squeezed down on the handle 20, the spring 44 is compressed to allow the rod 27 to move forward, the spring 32 remaining substantially uncompressed and moving bodily forward with the rod 27 and washer 31 until the motion of the rod is halted by abutting at its tip against the work backed up by the hook 25. Thereupon the handle 42 begins to compress the spring 32 to exert the desired welding pressure upon the work. The spring 44 being so much weaker than the spring 32, its effect in diminishing the welding pressure is practically negligible. On release, when the spring 32 has regained substantially its entire unstressed length, the spring 44 acts to retract the rod 27 as described.

Thus the tool described makes it possible to place electrodes in position to grasp and hold parts located in an ordinarily inaccessible situation, and to exert an adjustably predeterminable pressure upon the parts while a welding current is being passed through them between the electrodes.

The embodiment of the invention disclosed is illustrative and may be variously modified and departed from without departing from the spirit and scope of the invention as pointed out in and limited only by the appended claims.

What is claimed is:

1. A welding apparatus to grasp, press together and weld parts located in a difficultly accessible site and comprising a relatively long slender tubular electrode having a transversely positioned hook at the outer extremity thereof, a rod-shaped electrode housed within and longitudinally slidable in the tubular electrode toward and from the hook to grip parts to be welded therebetween, means including a compression spring acting on the rod and a lever acting on the spring to urge the rod toward the hook to exert pressure on the parts, and adjustable means to adjustably limit the excursion of the lever and thereby the pressure on the parts.

2. A welding apparatus to grasp, press together and weld parts located in a difficultly accessible site and comprising a relatively long slender tubular electrode having a transversely positioned hook at the outer extremity thereof, and a rod-shaped electrode housed within and longitudinally slidable in the tubular electrode toward and from the hook to grip parts to be welded therebetween, in combination with means including a compression spring acting on the rod to urge the rod toward the hook to exert pressure on the parts and adjustable means to adjustably limit the maximum pressure of the spring on the rod.

3. A welding apparatus to grasp, press together and weld parts located in a difficultly accessible site and comprising a tubular handle, a relatively long slender tubular member mounted in the handle, a tubular electrode mounted on the outer end of the member and having a transversely positioned hook at the outer extremity thereof, a rod housed within and longitudinally slidable in the tubular member and tubular electrode, an electrode tip mounted on the outer end of the rod and within the tubular electrode to be movable with the rod toward and from the hook to grip parts to be welded therebetween, an actuating lever mounted on the handle, and means interposed between the lever and the rod to transmit pressure from the lever to the rod to urge the electrode tip resiliently toward the hook.

4. A welding apparatus to grasp, press together and weld parts located in a difficultly accessible site and comprising a tubular handle, a relatively long slender tubular member mounted in the handle, a tubular electrode mounted on the outer end of the member and having a transversely positioned hook at the outer extremity thereof, a rod housed within and longitudinally slidable in the tubular member and tubular electrode, an electrode tip mounted on the outer end of the rod and within the tubular electrode to be movable with the rod toward and from the hook to grip parts to be welded therebetween, an actuating lever mounted on the handle, and a compression spring interposed between the lever and the rod to transmit pressure from the lever to the rod to urge the electrode tip resiliently toward the hook.

5. A welding apparatus to grasp, press together and weld parts located in a difficultly accessible site and comprising a tubular handle, a relatively long slender tubular member mounted in the handle, a tubular electrode mounted on the outer end of the member and having a transversely positioned hook at the outer extremity thereof, a rod housed within and longitudinally slidable in the tubular member and tubular electrode, an electrode tip mounted on the outer end of the rod and within the tubular electrode to be movable with the rod toward and from the hook to grip parts to be welded therebetween, an actuating lever mounted on the handle, a compression spring interposed between the lever and the rod to transmit pressure from the lever to the rod to urge the electrode tip resiliently toward the hook, and adjustable means to limit the travel of the lever and thereby limit the maximum pressure of the spring on the rod.

ARTHUR R. SWENSON.